(12) United States Patent
Macosky et al.

(10) Patent No.: US 8,589,207 B1
(45) Date of Patent: Nov. 19, 2013

(54) SYSTEM AND METHOD FOR DETERMINING AND VISUALLY PREDICTING AT-RISK INTEGRATED PROCESSES BASED ON AGE AND ACTIVITY

(75) Inventors: Edward M. Macosky, Norristown, PA (US); Kimberly F. Gress, Exton, PA (US); Matthew Molyneux, Douglassville, PA (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 13/471,847

(22) Filed: May 15, 2012

(51) Int. Cl.
*G06Q 10/00* (2012.01)

(52) U.S. Cl.
USPC .................. 705/7.27; 705/7.38; 705/7.39

(58) Field of Classification Search
USPC ....................... 705/7.27, 7.38, 7.39
See application file for complete search history.

(56) References Cited

U.S. PATENT DOCUMENTS

| | | | |
|---|---|---|---|
| 5,299,304 A | 3/1994 | Williams et al. |
| 5,410,675 A | 4/1995 | Shreve et al. |
| 5,794,246 A | 8/1998 | Sankaran et al. |
| 5,917,730 A | 6/1999 | Rittie et al. |
| 5,953,533 A | 9/1999 | Fink et al. |
| 6,014,670 A | 1/2000 | Zamanian et al. |
| 6,032,158 A | 2/2000 | Mukhopadhyay et al. |
| 6,038,590 A | 3/2000 | Gish |
| 6,044,374 A | 3/2000 | Nesamoney et al. |
| 6,106,569 A | 8/2000 | Bohrer et al. |
| 6,115,690 A | 9/2000 | Wong |
| 6,134,706 A | 10/2000 | Carey et al. |
| 6,208,990 B1 | 3/2001 | Suresh et al. |
| 6,223,180 B1 | 4/2001 | Moore et al. |
| 6,339,775 B1 | 1/2002 | Zamanian et al. |
| 6,343,275 B1 | 1/2002 | Wong |
| 6,418,400 B1 | 7/2002 | Webber |
| 6,626,957 B1 | 9/2003 | Lippert et al. |
| 6,640,226 B1 | 10/2003 | Shringeri et al. |
| 6,725,231 B2 | 4/2004 | Hu et al. |
| 6,782,371 B2 * | 8/2004 | Thompson et al. .......... 705/7.29 |
| 6,785,685 B2 | 8/2004 | Soetarman et al. |

(Continued)

FOREIGN PATENT DOCUMENTS

WO   WO 02/102097 A1   12/2002
WO   WO 2008/134627 A2   11/2008

OTHER PUBLICATIONS

Oracle Internal Controls Manager—data sheet Oracle, Apr. 2003.*

(Continued)

*Primary Examiner* — Scott L Jarrett
(74) *Attorney, Agent, or Firm* — Larson Newman, LLP

(57) ABSTRACT

An information handling system comprises a connection via a network interface for receiving business process data from an integrated business process running at a location, the business process data comprises at least data indicating data volume for the integrated business process. The information handling system further comprises a storage device for storing data representing an aggregate of business process data for an integrated business process and account data for the enterprise user of the integrated business process, and a processor adapted to determine a qualitative integrated business process performance designation from the aggregate business process data and account data. If the processor determines that there is no data volume from the business process data and no saved changes to the integrated business process within a specified time period, then the processor allocates an at-risk integrated business process performance designation and prepares a case file for this integrated business process.

18 Claims, 5 Drawing Sheets

(56) References Cited

U.S. PATENT DOCUMENTS

| | | | |
|---|---|---|---|
| 6,789,096 B2 | 9/2004 | Sankaran et al. | |
| 6,820,077 B2 | 11/2004 | Godfredsen et al. | |
| 6,820,135 B1 | 11/2004 | Dingman et al. | |
| 6,823,373 B1 | 11/2004 | Pancha et al. | |
| 6,848,081 B1 | 1/2005 | Yoda et al. | |
| 6,850,947 B1 | 2/2005 | Chung et al. | |
| 6,854,107 B2 | 2/2005 | Green et al. | |
| 6,895,409 B2 | 5/2005 | Uluakar et al. | |
| 6,895,471 B1 | 5/2005 | Tse et al. | |
| 6,922,831 B1 | 7/2005 | Kroening et al. | |
| 6,988,165 B2 | 1/2006 | White et al. | |
| 6,993,743 B2 | 1/2006 | Crupi et al. | |
| 6,996,584 B2 | 2/2006 | White et al. | |
| 7,047,219 B1* | 5/2006 | Martin et al. | 705/37 |
| 7,047,488 B2 | 5/2006 | Ingersoll et al. | |
| 7,117,215 B1 | 10/2006 | Kanchwalla et al. | |
| 7,162,643 B1 | 1/2007 | Sankaran et al. | |
| 7,171,647 B1 | 1/2007 | Smith et al. | |
| 7,181,457 B2 | 2/2007 | Reinauer et al. | |
| 7,216,292 B1 | 5/2007 | Snapper et al. | |
| 7,383,215 B1* | 6/2008 | Navarro et al. | 705/36 R |
| 7,496,888 B2 | 2/2009 | Sanjar et al. | |
| 7,499,951 B2 | 3/2009 | Mueller et al. | |
| 7,584,192 B2 | 9/2009 | Rey et al. | |
| 7,590,724 B1 | 9/2009 | Williams | |
| 7,610,575 B2 | 10/2009 | Sproule | |
| 7,698,634 B2 | 4/2010 | Bhatia et al. | |
| 7,765,136 B2* | 7/2010 | Northington et al. | 705/35 |
| 7,792,784 B2 | 9/2010 | Gupta | |
| 7,941,784 B2 | 5/2011 | Shenfield et al. | |
| 8,010,845 B2 | 8/2011 | Rui et al. | |
| 8,036,939 B2 | 10/2011 | Gil et al. | |
| 8,060,396 B1* | 11/2011 | Bessler et al. | 705/7.23 |
| 8,095,416 B2* | 1/2012 | Harvey et al. | 705/7.39 |
| 8,126,762 B2 | 2/2012 | Ramachandran et al. | |
| 8,165,993 B2* | 4/2012 | Broda et al. | 707/634 |
| 8,271,615 B2 | 9/2012 | Ellison et al. | |
| 8,276,115 B2* | 9/2012 | Bates et al. | 717/106 |
| 8,315,939 B2* | 11/2012 | Blank | 705/36 R |
| 2001/0052112 A1 | 12/2001 | Mohan et al. | |
| 2002/0016771 A1 | 2/2002 | Carothers et al. | |
| 2002/0073396 A1 | 6/2002 | Crupi et al. | |
| 2002/0095650 A1 | 7/2002 | Green et al. | |
| 2002/0104067 A1 | 8/2002 | Green et al. | |
| 2003/0144891 A1* | 7/2003 | Leymann et al. | 705/7 |
| 2003/0221184 A1 | 11/2003 | Gunjal et al. | |
| 2003/0236677 A1* | 12/2003 | Casati et al. | 705/1 |
| 2004/0068431 A1* | 4/2004 | Smith et al. | 705/10 |
| 2004/0133876 A1 | 7/2004 | Sproule | |
| 2004/0236683 A1* | 11/2004 | Guermonprez et al. | 705/40 |
| 2005/0005262 A1 | 1/2005 | Mohan et al. | |
| 2005/0198618 A1 | 9/2005 | Lalonde et al. | |
| 2005/0209903 A1 | 9/2005 | Hunter et al. | |
| 2005/0273758 A1 | 12/2005 | Long | |
| 2006/0017947 A1 | 1/2006 | Wang et al. | |
| 2006/0161495 A1 | 7/2006 | Wigzell | |
| 2006/0184933 A1 | 8/2006 | Chessell et al. | |
| 2006/0230066 A1 | 10/2006 | Kosov et al. | |
| 2007/0150385 A1* | 6/2007 | Ode | 705/30 |
| 2007/0168206 A1* | 7/2007 | McCall et al. | 705/1 |
| 2008/0154668 A1* | 6/2008 | Kuo et al. | 705/7 |
| 2008/0163164 A1* | 7/2008 | Chowdhary et al. | 717/106 |
| 2008/0196006 A1 | 8/2008 | Bates et al. | |
| 2008/0209078 A1* | 8/2008 | Bates et al. | 710/10 |
| 2008/0243884 A1 | 10/2008 | Mehta | |
| 2008/0270977 A1 | 10/2008 | Nucci et al. | |
| 2009/0006267 A1* | 1/2009 | Fergusson et al. | 705/36 R |
| 2009/0112666 A1* | 4/2009 | Guo et al. | 705/7 |
| 2009/0171758 A1 | 7/2009 | Alfandary et al. | |
| 2009/0228428 A1 | 9/2009 | Dan et al. | |
| 2010/0023362 A1* | 1/2010 | Nguyen et al. | 705/7 |
| 2010/0031140 A1 | 2/2010 | Cummins | |
| 2010/0042641 A1 | 2/2010 | Kamalakantha et al. | |
| 2010/0070317 A1 | 3/2010 | Pachter et al. | |
| 2010/0070556 A1 | 3/2010 | Heusermann et al. | |
| 2010/0070981 A1 | 3/2010 | Hadar | |
| 2010/0138257 A1 | 6/2010 | Wocher et al. | |
| 2010/0169148 A1 | 7/2010 | Oberhofer et al. | |
| 2010/0185510 A1 | 7/2010 | Maier et al. | |
| 2010/0306709 A1 | 12/2010 | Lynch et al. | |
| 2010/0332510 A1 | 12/2010 | Gitai et al. | |
| 2010/0332535 A1 | 12/2010 | Weizman et al. | |
| 2011/0004627 A1* | 1/2011 | Reca et al. | 707/778 |
| 2011/0029575 A1 | 2/2011 | Sagi et al. | |
| 2011/0078607 A1 | 3/2011 | Ryan et al. | |
| 2011/0218843 A1* | 9/2011 | Goel et al. | 705/7.39 |
| 2011/0282715 A1* | 11/2011 | Nguyen et al. | 705/7.39 |
| 2012/0041945 A1* | 2/2012 | Blubaugh | 707/722 |
| 2012/0096279 A1* | 4/2012 | Roberts et al. | 713/184 |
| 2012/0246573 A1 | 9/2012 | Arokiaswamy | |

OTHER PUBLICATIONS

Few, Stephen, Intelligent Dashboard Design Perceptual Edge, Sep. 2005.*

Resnick, Marc L., Building the Executive Dashbarod Proceedings of the Human Factors and Ergometrics Society 47th Annual Meeting, 2003.*

Evans, Owen B., Billing Score Card University of Missippi Medical Center, 2006.*

The Financial Edge—Dashboard Guide Blackbaud, Inc., 2011.*

Bordeleau, David, Exploring Alternative Predictive Modeling Techniques to Strengthen the Customer Relationship SAS SUGI31, Data Mining and Predictive Modeling, 2006.*

Kareo.com Web pages—Dashboards Kareo, Jan. 2010, Retrieved from Archive.org Feb. 19, 2013.*

Gonzalez, Tom, Designing Executive Dashboards—Part 1 BrightPoint Consulting, Inc. 2005.*

Gonzalez, Tom, Designing Executive Dashboards—Part 2 BrightPoint Consulting, Inc. 2005.*

Boomi AtomSphere—Help Pages Boomi, Help.Boomi.Com, Apr. 29, 2010, Retrieved from Archive.org.*

Boomi AtomSphere—Help Pages—Section 5.2 Executing a Process Boomi, Nov. 9, 2010, Retrieved from Archive.org.*

Boomi AtomSphere—Help Pages—Section 5.3 0 View Process Executions Boomi, Nov. 9, 2010, Retrieved from Archive.org.*

"The Quest for a Cloud Integration Strategy," Boomi Whitepaper, 2011, http://marketing.boomi.com/QuestForCloudIntegration.html.

Boomi Integration Platform datasheet Boomi, Inc., 2006.

Boomi on Demand product data sheet Boomi, Inc., 2007.

Boomi AS2 Transport datasheet Boomi, Inc., 2006.

Boomi, Inc., Announces General Availability of the Boomi Integration Platform V3.0, PR Newswire, Jan. 16, 2004.

Dell Agrees to Acquire Software Firm Boomi Wall Street Journal, Nov. 3, 2010.

Silk, Scott, Automating the Balanced Scorecard Management Accounting, vol. 19, No. 11, May 1998.

Arnold, Tom, Dashboard & Scorecard Software Tools for Operations Management and Strategy Deployment Summit Media Partners, Sep. 18, 2002.

Norton, David, SAP Strategic Enterprise Management: Translating Strategy Into Action: The Balanced Scorecard SAP, May 1999.

TIBCO Staffware Process Suite product brochure TIBCO Software Inc., 2006.

Chambers, Bill et al., Real-Time Data Access Using Business Process Management VARBusiness, vol. 19, No. 23, Nov. 10, 2003.

Sturim, Robert, Achieving Competitive Advantage Through Supply Chain Integration Vitria Technology Inc., 1999.

Intalio Adds Celequest BAM Technology to Its BPMS Solution; Celequest Management Dashboards Integrated into lntalio/BPMS, Business Wire, Jan. 17, 2006.

Viane, Stijn et al., Corporate Performance Management: Beyond Dashboards and Scorecards Journal of Performance Management, vol. 20, No. 1, 2007.

Ergometrics.com web pages Ergometrics, Mar. 2000, Retrieved from Archive.org Jan. 25, 2007.

iDashes.net web pages iDashes, Inc., May 2001, Retrieved from Archive.org Jan. 25, 2007.

(56) References Cited

OTHER PUBLICATIONS

Performance Dashboards: Measuring, Monitoring, and Managing Your Business: Education and Research the Data Warehouse Institute, PowerPoint presentation, 2006.
Eckerson, Wayne E., Performance Dashboards: Measuring, Monitoring, and Managing Your Business: John Wiley & Sons, ISBN 13-978-0-471-724179-9, 2006.
Boomi AtomSphere, Boomi, Inc., 211 pages http://web.archive.org/web/20100429065017/http:/help.boomi.com/display/BOD/Boomi+AtomSphere+Helpboomi.com/display/BOD/Boomi+AtomSphere+Help.
Boomi AtomSphere, Boomi, Inc., 47 pages http://help.boomi.com/atomsphere/#GUID-B17ADCD8-8B85-4D68-A360-9552EAA22225.html.
Boomi AtomSphere web, Boomi, Inc., http://help.boomi.com/atomsphere/#GUID-B17ADCD8-8B85-4D68-A360-9552EAA22225.html.
Boomi AtomSphere Maps, Boomi, Inc., http://help.boomi.com/display/BOD/3.4+-+Building+Data+Maps.
Boomi AtomSphere API, Boomi, Inc., http://help.boomi.com/atomsphere/#GUID-C6847C47-5EFF-4933-ADA1-A47D032471C6.html.
Boomi AtomSphere Getting Started, Boomi, Inc., http://help.boomi.com/atomsphere/GUID-43F13F31-E82A-4AF8-BE49-9213D4715411.html#GUID-B522EE93-E8A2-43CC-9D3E-EF37371AEF32.html.
Boomi AtomSphere Core Terms, Boomi, Inc., http://help.boomi.com/atomsphere/GUID-CD1886F1-DCAC-41C1-A255-4287B78A2DE7.html.
Dell Boom AtomSphere Fall Release Harnesses Power of World's Largest Integration Cloud to Simplify Integration Complexity; http://www.boomi.com/news_and_events/press_releases/25102011.
Boomi AtomSphere Help, Boomi, Inc., Apr. 29, 2010 web.archive.org/web/20100429065017/http://help.boomi/display/BOD/Boomi+AtomSphere+Help.
Boomi AtomSphere Build, Boomi, Inc., Apr. 29, 2010 web.archive.org/web/20100429041219/http://help.boomi/display/BOD/3+-+Build.
Boomi AtomSphere Building Connectors, Boomi, Inc., May 10, 2010 web.archive.org/web/20100510115902/http://help.boomi/display/BOD/3.2+-+Building+Connectors.
Boomi AtomSphere Building Processes, Boomi, Inc., Dec. 12, 2009 web.archive.org/web/20091212010359/http://help.boomi/display/BOD/3.1+-+Building+Processes.
Boomi AtomSphere Manage, Boomi, Inc., Apr. 30, 2011 web.archive.org/web/20110430060121/http://help.boomi/display/BOD/5+-+Manage.
Boomi AtomSphere Monitoring Atoms, Boomi, Inc.,Nov. 9, 2010 web.archive.org/web/20101109011443/http://help.boomi/display/BOD/5.1+-+Monitoring+Atoms.
Boomi AtomSphere Executing a Process, Boomi, Inc., Nov. 9, 2010 web.archive.org/web/20101109025104/http://help.boomi/display/BOD/5.2+-+Executing+a+Process.
Boomi AtomSphere Viewing Process Executions, Boomi, Inc., Nov. 9, 2010 web.archive.org/web/20101109011449/http://help.boomi/display/BOD/5.3+-+Viewing+Process+Executions.
Boomi AtomSphere Atom Management, Boomi, Inc., May 19, 2011 web.archive.org/web/20110519171500/http://help.boomi/display/BOD/5.4+-+Atom+Management.
Boomi AtomSphere The Boomi Atom, Boomi, Inc., Jun. 13, 2010 web.archive.org/web/20100613115315/http://help.boomi/display/BOD/8+-+The+Boomi+Atom.
SAP Solution Manager: Solution Monitoring—Active Global Support SAP 2005.
Using Business Activity Monitoring ES Dashboard, Adobe LiveCycle ES Version 8.0 Adobe, Jul. 2007.
IBM FileNet P8, Version 5.0—Help web pages IBM, Nov. 2010.
SAP Solution Manager 3.1: Strategic Background and Functional Overview SAP 2003.

\* cited by examiner

US 8,589,207 B1

SYSTEM AND METHOD FOR DETERMINING AND VISUALLY PREDICTING AT-RISK INTEGRATED PROCESSES BASED ON AGE AND ACTIVITY

CROSS REFERENCE TO RELATED APPLICATIONS

Related subject matter is contained in co-pending U.S. patent application Ser. No. 12/110,607 entitled "System and Method For Automated On-Demand Creation of a Customized Software Application," filed on Apr. 28, 2008, the disclosure of which is hereby incorporated by reference.

Related subject matter is also contained in co-pending U.S. patent application Ser. No. 13/333,517 entitled "System to Automate Development of System Integration Application Programs and Method Therefor," filed on Dec. 21, 2011, the disclosure of which is hereby incorporated by reference.

FIELD OF THE DISCLOSURE

This disclosure generally relates to information handling systems, and more particularly relates to predicting integrated business processes performance.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, procurement, stocking and delivery tracking, provision of data services and software, airline reservations, enterprise data storage, or global communications. In addition, information handling systems may include a variety of hardware and software components that may be configured to process, store, and communicate information and may include one or more computer systems, data storage systems, and networking systems. Today, most business enterprises have sophisticated computing systems that are used both for internal operations, and for communicating outside the enterprise's network.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
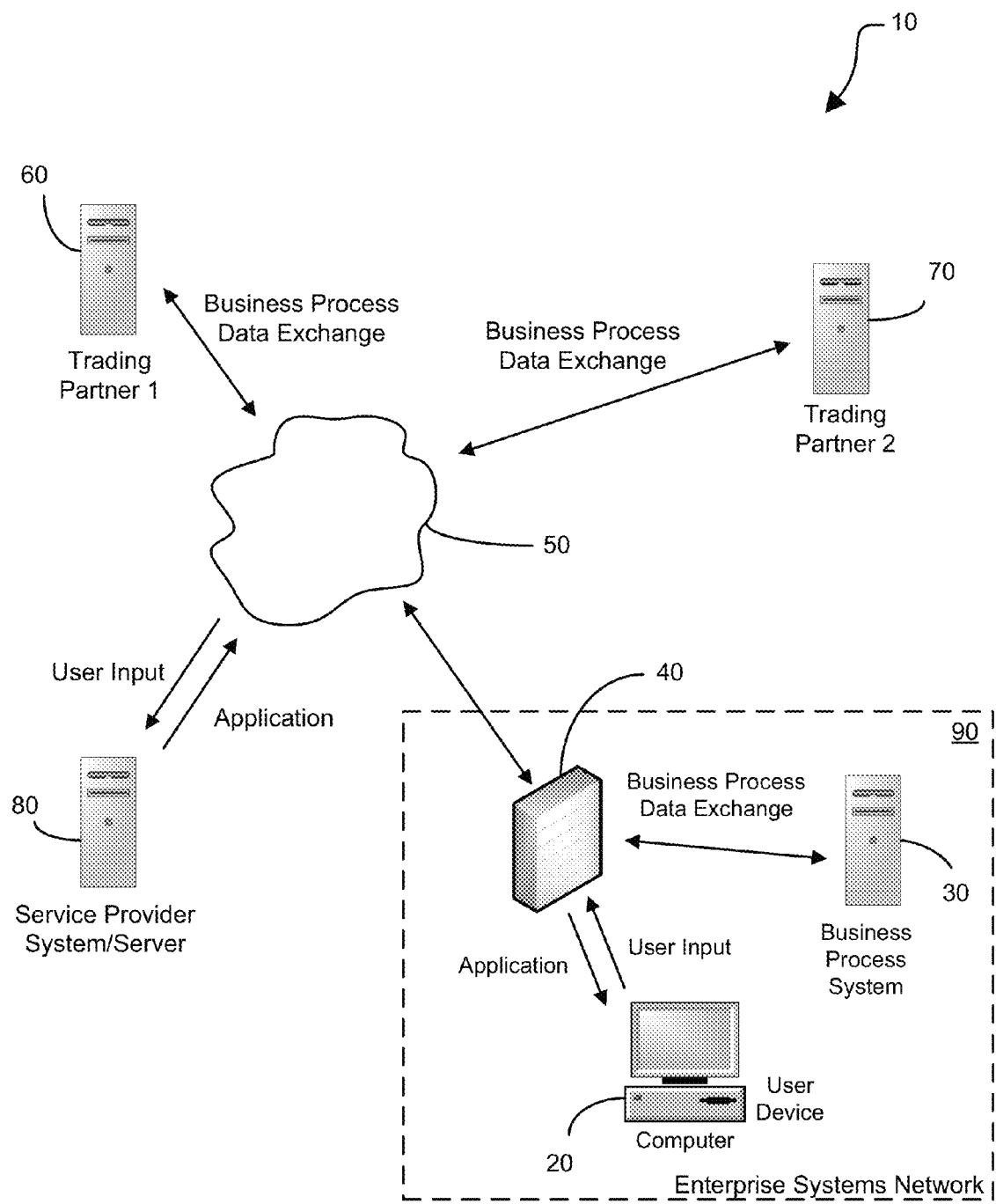
FIG. 1 is a block diagram illustrating a distributed business network system according to an embodiment of the present disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of architectures such as distributed computing architectures, client or server architectures, or middleware server architectures and associated components.

Today, most businesses and other enterprises have sophisticated computing systems that are used for facilitating internal operations and for communicating outside the enterprise's network, for example to exchange information with business partners. Much of present day information exchange is conducted electronically, via communications networks, both internally to the enterprise, and among enterprises. Accordingly, it is often desirable or necessary to exchange information or data between distinctly different computing systems, computer networks, software applications, etc. The enabling of communications between diverse systems or networks or applications in connection with the conducting of business processes is often referred to as business process integration.

Relatively recently, systems have been established to enable exchange of data via the Internet, such as via web-based interfaces for business-to-business and business-to-consumer transactions. For example, a buyer may operate a personal computer (PC) to connect to a seller's website to manually enter data using a web interface provided by the seller's computing system. In higher volume environments, a buyer may use an executable software application known as Electronic Data Interchange (EDI) Software, or Business-to-Business Integration Software to connect to the seller's computing system and to deliver electronically a business document, such as a purchase order, without requiring human intervention to manually enter the data. These applications are typically purchased from software vendors and installed on a computerized system owned and maintained by the business, in this example the buyer. The seller will have a similar or complementary software application on its system, so that the information exchange may be completely automated in both directions. In contrast to the system presently disclosed, these applications are purchased, installed and operated on the user's local system. Thus, the user typically owns and maintains its own copy of the system, and configures the application locally to connect with its trading partners.

In both the traditional and more recent approaches, the executable software application is universal or generic as to all trading partners before it is received and installed within a specific enterprise's computing network. In other words, it is delivered to different users or systems in an identical, generic form. The software application is then installed within a specific enterprise's computing network, which may include data centers, etc. located outside the physical boundaries of the enterprise. After the generic application is installed, it is then configured and customized for a specific trading partner. The customized application can be executed to exchange data between the specific trading partner and the enterprise. For example, Wal-Mart may provide on its website specifications of how electronic data such as Purchase Orders and Invoices must be formatted for electronic data communication with Wal-Mart, and how that data should be communicated with Wal-Mart. A supplier or enterprise is then responsible for finding a generic, commercially-available software product that will comply with these communication requirements and configuring it appropriately. Accordingly, the software application will not be customized for any specific supplier until after that supplier downloads the software application to its computing network and configures the software application for the specific supplier's computing network, etc. Alternatively, the supplier may engage computer programmers to create a customized software application to meet these requirements, which is often exceptionally time-consuming and expensive.

In the business process integration context, communication should occur between different software applications or systems within a single computing network, such as between an enterprise's information warehouse management system and the same enterprise's purchase order processing system. Communication should also occur between different software applications or systems within different computing networks, such as between a buyer's purchase order processing system and a seller's invoicing system. Upon integration of the business processes, it is helpful to users to be able to monitor various metrics relating to the integrated processes. For example, the monitored information may be used for diagnostic purposes and planning purposes. The data gathered while monitoring the execution of an integrated business process event may be stored as a business process execution record for that event. The types of data gathered and the historical record of that gathered data may be referred to as monitored business process data.

A more comprehensive set of data relating to further detail about the integrated business processes may also be gathered. This additional detailed data may be referred to as tracked data. This tracked data may be important in the business-to-business (B2B) context. Tracked data allows a user access to details enabling a more thorough analysis and diagnosis of an integrated business process. For example, a user may track progress of orders more effectively in an integrated business process with tracked data.

In particular when multiple integrations are simultaneously operating, the collection of monitored integrated business process data or the higher level tracked data may be very valuable to the users of the integrated business processes. For example, the aggregated data from each integrated business process may be analyzed via algorithm to predict the integrated business process system performance. Such performance prediction allows the service provider or user to identify problems among the many integrated business processes that may be running Knowing this information in advance permits the user or service provider to be proactive about correcting the problems.

U.S. patent application Ser. No. 12/110,607 entitled "System and Method For Automated On-Demand Creation of a Customized Software Application," shows a system for automated development of customized executable system integration software applications. For example, an enterprise can define an integration system via a modeling process to enable bi-directional exchange of data between internal applications, between internal applications and external trading partners, or between internal applications and applications running external to the enterprise. Applications running external to the enterprise are commonly referred to as Software as a Service (SaaS). Integration software can assist defining the business process to be integrated by a user. Each integrated business process represents a complete end-to-end interface. For example, a process could be customized to accept a purchase order (PO) from a retailer such as Wal-Mart, transform the PO into a format recognizable by a certain internal order management software application of the enterprise, and then insert the contents of that PO directly into the enterprise's order management system. The customized executable system integration software application that results provides the desired interoperability as defined by the party using the integration software application code. It is prediction methodology pertaining to the performance of the integrated business processes using these customized executable system integration software applications that is discussed herein.

FIG. 1 shows a distributed business network system 10 including conventional information handling systems of a type typically found in client/server computing environments. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router, wireless router, or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

More specifically, the system 10 includes a conventional user/client device 20, such as a personal computer, enabling a user to communicate via a communications network 50, such as the Internet. The exemplary user device 20 may be configured with conventional web browser software. The web browser, such as Microsoft Corporation's Internet Explorer web browser software, allows the user to interact with websites via the network 50. The client device 20 is positioned within an enterprise network 90 behind an enterprise network's firewall 40. For illustrative purposes, the enterprise network 90 includes a business process system 30, which may include conventional computer hardware and commercially available Enterprise Resource Planning (ERP) and other business process software, such as QuickBooks, SAP's MySAP ERP, Oracle's OneWorld JP Edwards' ERP, Infor's WMS application, and the like. The system 10 further includes trading partner systems 60 and 70 for receiving and/or transmitting data relating to business-to-business transactions. For example, Wal-Mart may operate trading partner system 60 to allow for issuance of purchase orders to suppliers and to receive invoices from suppliers in electronic data form as part of electronic data exchange processes.

Finally, the system 10 includes a service provider system or server 80. In one embodiment, the service provider server 80 may generate a customized executable system integration software application to run an integrated business process at an enterprise location or another hosted location. In another embodiment, the service provider server 80 may monitor one or more business processes running at various locations. Business process data may be reported to the service provider server 80 from business processes running at hosted locations or enterprise locations in various embodiments. This business process data may be aggregated and stored at the server 80. In an additional embodiment, the service provider server 80 may administer one or more business processes. The service provider server 80 may run a performance prediction system and assign qualitative integrated business process performance designations to the integrated business process or the account associated with the integrated business process. In one embodiment, the service provider server 80 may generate and assign qualitative integrated business process performance designation to the aggregate business process data associated with a specific deployed integrated business process. Alternatively, service provider server 80 may assign the qualitative integrated business process performance designation to stored account data for the user of the integrated business process. In other embodiments, one or more functions described above may occur at a system or server in a different location, such as an enterprise network 90 or at a trading partner location.

The system and methods disclosed herein allow a service provider, an enterprise, or even a trading partner to analyze aggregated business process data, tracked data or account data. Using various factors from the monitored data and account data, the process performance prediction system may prepare and assign qualitative integrated business process performance designations. The qualitative integrated business process performance designations are helpful to users or enterprises to assess and predict satisfaction by trading partners (e.g., 60 and 70) in using one or more deployed integrated business processes. It may also predict users' technical problems, usage, and dissatisfaction with the deployed integrated business process software. This predictive information may be used by a service provider deploying the integrated business process software.

The performance prediction system of the current embodiment may assign a qualitative integrated business process performance designation and perform an action to assist resolving the predicted problem. Green status is one qualitative integrated business process performance designations. It indicates that the deployed integrated business process has data volume flowing through it, appears stable, and is satisfactorily operating. In this case, the aggregate integrated business process data is updated with the status and information about the operation. For example, in one embodiment the integrated business process is designated as green or satisfactory if account or aggregated business process data shows the integrated business process has had recent data volume processed by the deployed integrated business process. Data volume may include a measure of bytes of data or documents input into an integrated business process, a measure of bytes of data or documents output from an integrated business process, or a throughput measurement of data volume from the integrated business process. A throughput measurement may be measured by adding input data plus output data. Optionally, the throughput measurement may also divide the input and output data sum by two or some other factor depending on the ratio of input documents to output documents. Any measurement of data passing through the deployed integrated business process could comprise the data volume.

In another embodiment, the integrated business process is designated as green or satisfactory if account or aggregated business process data shows that recent changes to the integrated business process have been stored, or that the account is new or the integrated business process is recently licensed. This may indicate that the deployed integrated business process is new and still in the process of being tested or adjusted before going active.

Another qualitative integrated business process performance designation is yellow. A yellow status indicates some problems or lack of activity. It may further indicate that the account or integrated business process has been set up for some time. In other words, the user has had ample time to prepare and activate the integrated business process. As a result, the performance prediction system assigns a yellow or an at-risk business process performance designation to the integrated business process. Yellow status may be useful to predict problems and indicate to a service provider, for example, that a user or trading partner should be contacted to check on the progress. The performance prediction system may update the aggregate integrated business process data in this embodiment with the status and information about the operation. Example operation information may include an indication of no recent data volume or no recent saved changes to the deployed integrated business process. Additional operation information may include an indication that the integrated business process or the account of the user of a customized executable system integration software application is older than a given age limit. In connection with assigning an at-risk designation, the performance prediction system may create a client case. The client case file may have details of the status and operational information for the integrated business process. This case file, which also may include a case report, can be used by the service provider or another party to assist in resolving the predicted problems.

Red status, in the one embodiment, indicates serious problems or lack of activity. The red status indicates an account or usage of an integrated business process is at risk of cancellation or non-renewal. The red designation triggers the set up of a client case with actions by the system to assist the service provider or user to address any problems predicted with integrated business processes. The performance prediction system may update the aggregate integrated business process data in this embodiment with the red or threat-to-cancel status and information about the operation. Example operation information may include an indication of no recent data volume, no recent saved changes to the deployed integrated business process, or a stale account with little or no recent activity. Also, the aggregate integrated business process data or the account data may indicate customer service calls received. It may indicate how many, customer service calls, how recent those call were received, and the nature of the problems. In connection with the threat-to-cancel status, the performance prediction system may also create a client case and a warning that an account needs attention or resolution. The client case file may be used to resolve the problem or determine if the account or integrated business process should be closed or taken off-line. If the latter is determined, the account may be closed by the service provider or user.

FIGS. 1-5 illustrate a system and method for predicting integrated business processes running one or more customized executable system integration software applications based on workflow data and/or other inputs. The business process integration for each customized executable system integration software application may be automatically developed on-demand and real-time for an enterprise by a service provider system or server within the network 10 depicted in FIG. 1. The customized executable system integration software applications run one or more business integration processes. Each may integrate one or more internal enterprise applications, one or more types of external applications (for example, those of a trading partner), or some combination of both. The execution of the code for the customized executable system integration software application that integrates the exchange of electronic data is referred to as a business process event. An integrated business process event may exchange any amount of data or any number of documents. The operation of the customized executable system integration software application during an integrated business process event may be monitored in its entirety or in a subset of parts. The monitoring may be customized for various purposes such as testing, health or status of the integrated business process elements, or assessment of usage of the integrated business processes. Other data points may be tracked as well, such as individual information about each document that passes through the system, information about relatedness of inbound and outbound documents, and connector records indicating document classes, types, and filenames of documents that have passed through the connector. This type of data may be referred to as tracking data.

Account data, also referred to as account information, may also be maintained at the service provider system/server or at another location such as a user device. Account data indicates the user of the system and services generating the customized executable system integration software applications and deploying the integrated business processes. The account data may indicate user identification and contact information such as a billing address, identity of a lead person, as well as the status of the license to the system and software. Other information comprising account data may include how many customized executable system integration software applications are generated for deployment, when they were deployed, and locations of deployment. The account data also maintains dates when the account was established and shows the age of the account. The account information may also record changes made to deployed integrated business processes and when those changes were made.

Account data may also contain information relevant to embodiments involving hosted deployments. For example, account data may indicate resource levels and settings determined by a user or optimization system for a deployed integrated business process. It may indicate where those resources are located and record adjustments or changes to those resources. Additionally, billing and payment information related to the hosting services will be part of the account information in this embodiment. For example, account data may track the level of resources requested and used during hosting of the integrated business process.

The customized executable system integration software application may be packaged within a container program, also referred to herein as a dynamic runtime engine. An example runtime engine that may package the customized executable system integration software application is a JAVA runtime engine. The dynamic runtime engine may be an executable software application capable of running on a computer within the enterprise's network, which may include networks owned and/or operated by third party data center providers such as OpSource or Amazon. Alternatively, the runtime engine may be distributed and operate on one or more hosted information handling systems accessible by a customer or user. As changes are made to the model underlying the customized executable system integration software application, the executable software application can automatically check for and apply these changes as needed without requiring human intervention.

Returning to the monitored business process data and tracking data, this data may be reported from the information handling system location operating the runtime engine that runs the customized executable system integration software application. This location may be a hosted runtime engine, a local runtime engine, or some networked combination of either or both. The monitored business process data and tracking data is reported back to a service provider server 80 or may be reported to an information handling system within the enterprise system/network 90.

Each business process utilizing a customized executable system integration software application is associated with its respective users and/or trading partners. This is the account information for that particular customized executable system integration software application deployment. A service provider or user may choose to group integrated business processes and their monitored and tracked data to assess the function of customized executable system integration software applications across a broader perspective, for example multiple deployments at a given location or multiple deployments within a given user account. A user account may also have associated sub-accounts or other related accounts. Analysis of the monitored and tracked data may permit prediction of problems or errors in deployment of integrated business processes at a given enterprise location or in a hosted environment.

Figure 2:
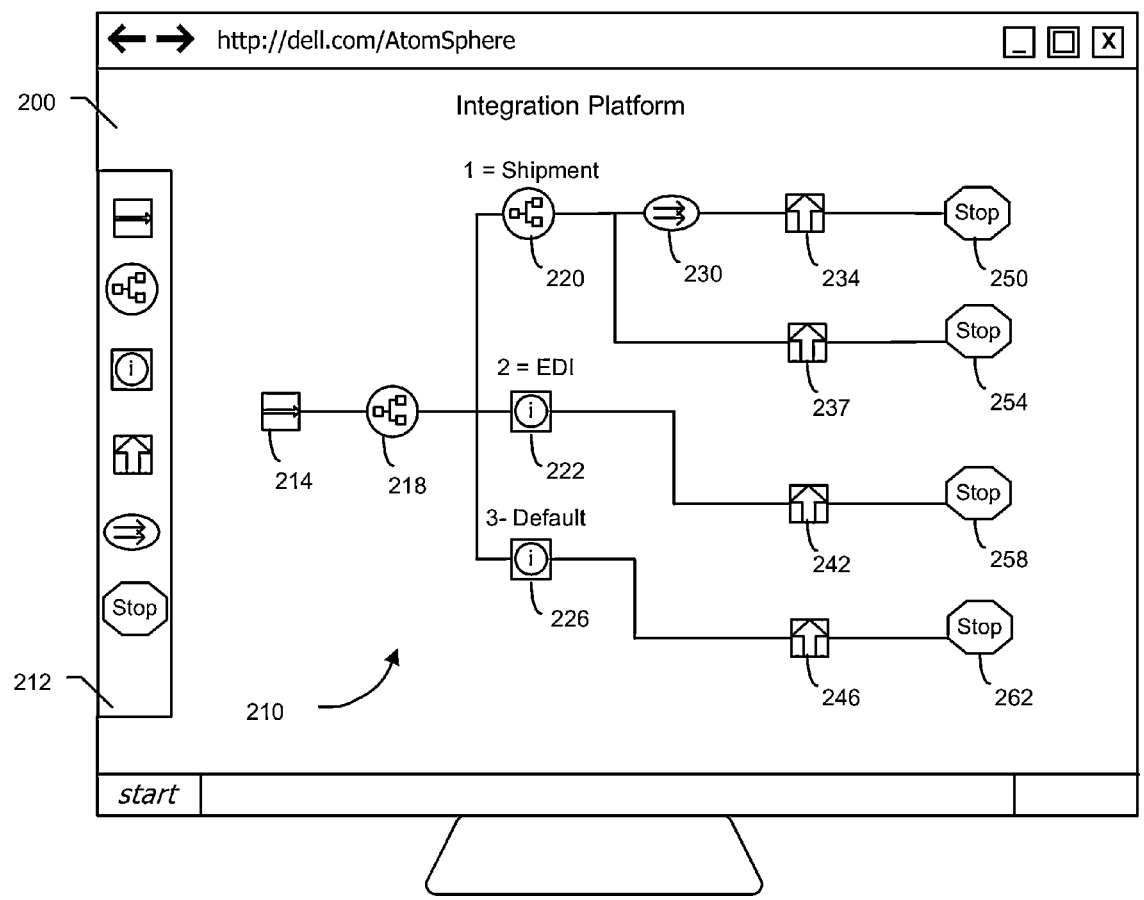
FIG. 2 illustrates a visual model of an example business process according to an embodiment of the present disclosure.

The user may create a model business process or processes to be executed by the customized executable system integration software application via graphical editor. The exemplary flow diagram of FIG. 2 shows such a modeled business process and includes an Inbound connector element 214, Routing process elements 218 and 220, Document Property elements 222 and 226, Data Transformation process element 230, Outbound connector elements 234, 238, 242, and 246, and Process End elements 250, 254, 258 and 262. Since the elements may require data input from a user, the resulting codesets that make up the customized executable system integration software application contain information about each element. For example, the inbound connector element 214 may be configured for a specific enterprise and process with data input via dialog boxes or selecting menu items, etc. as appropriate. For example, data entry element 214 may be configured such that the input data will be inbound from an SAP system. The element, in combination with data related to that portion of the business process is associated with a specific Connector code set stored in the memory of the system 80. Each Connector is comprised of a modular codeset that is customized for communicating with the specific software application or system. The customized codeset therefore provides connectivity for specific software applications, databases, and/or systems. The outbound connector elements may be similarly configured. For example, the last step of the integrated business process may involve sending shipping order data to Company X system. The Shipping Order will be prepared as an XML message, which is a readily recognizable format. The XML message is then sent to the outbound connector, and the outbound connector converts the XML message from this simple, recognizable format into the proprietary format that is understood by the SAP system. The input and output data formats for the conversion are associated with the modular codeset selected and customized for the outbound connector element. Additionally, the routing element may require custom data associated with it for proper application of the routing logic; the Document Properties element may require input for file naming, file storage location, etc. to be applied. There may be other elements that result in codesets for the customized executable system integration software application as customized by the user and generated by the service provider.

Each branch of the flow diagram represents an end-to-end business process to be integrated. In the example of FIG. 2, the first (top-most) branch may model a process involving receipt of data from an SAP system in a corresponding format, routing the data according to prescribed logic (for example, 1=shipment), further routing according to further logic, transforming the data from the SAP system format to the destination system format by Data Transformation process element 230 to create an appropriately formatted XML document, and then transmitting the transformed data to the destination system in accordance with the properties and attributes of the outbound application connector 234. Examples of other common activities include synchronizing customer data between applications, synchronizing product information between applications, notification of receipt of goods ordered by a retailer, receipt of a work related injury claim, and many others. The model business process or processes are automatically assembled into customized executable codesets that form the customized executable system integration software applications. These customized executable system integration software applications may be run at an enterprise network location or hosted in a cloud computing environment such as one hosted by the service provider.

For example, an enterprise account using a customized executable system integration software application will execute a business process at one or more locations. The business process execution locations for an account are sometimes referred to herein as atoms. However, a given atom may have more than one business process run at the same location. For example, one may be a test business process, while another at the same location may be a "live" operating business process. Monitored business process data and tracked data may be reported from an account location and a specific atom running an integrated business process.

The execution of the integrated business processes may be monitored by the customized executable system integration software applications themselves. Additionally, more specific information relating to the documents or data processed by the integrated business process may be tracked for one or more executions of the business process. In an example embodiment, this monitored business process data and the tracked data may be ultimately collected by the service provider system/server 80 or some other system or server within the enterprise network 90. Data is gathered for several operational metrics and reported to the service provider database. First, however, monitored business process data and tracking data are recorded and collected at the enterprise or hosted location. While the customized executable system integration software application is running, the data may be kept in RAM or stored at a local database (for example, a disk). Reporting of the operational metrics of the customized executable system integration software application may alternatively be monitored by and reported to a database maintained at the user's enterprise hardware in the Enterprise Systems Network 90. In yet another alternative embodiment, operational metrics for the customized executable system integration software application may be monitored by and reported to systems/servers and database locations of individual trading partners 60 and 70.

During an execution of the customized executable system integration software applications that integrate diverse user applications and business processes, several types of operational metrics and identifying information are gathered and reported. This monitored business process data creates a process execution record. The categories of data that may be monitored in a process execution record comprise the monitored business process data for customized executable codesets that form the customized executable system integration software applications. In other words, the monitored business process data is the data that is kept for each execution of an integrated business process. This data is aggregated and stored for each executable system integration software application deployed for a user.

The customized executable system integration software applications gather and store monitored business process data including, for example: the business process name; the unique identifier of each business process (business process ID); the unique identifier of each business process execution (execution ID); the account identification of the enterprise user of the integration application (account ID); and the identification and name of the enterprise location running the business process integration (account ID and Name). Other identification data may also be monitored and stored such as relatedness data of accounts and connector usage, type, and number deployed. These various types of identification information may be made part of the business process execution record.

The customized executable system integration software application elements measure and store monitored business process data including, for example: the business process integration start time; the business process integration running time; data input levels; data output levels; input document counts; output document counts; throughput levels; execution counts; and overall process errors. Several other factors identifying business processes or measuring usage and activity of the customized executable system integration software applications may also be gathered or measured as monitored data. These various types of metrics may also be made part of the business process execution record. Table 1 shows example types of monitored business process data fields that may be included in the business process execution record.

| FIELD | DESCRIPTION |
| --- | --- |
| Execution ID | Unique identifier assigned to an execution |
| Account ID | Unique identifier assigned to a user or enterprise |
| Location ID and Name | Name and number ID assigned to the location of the business process |
| Location Local ID | ID number of the local location within the cloud hosting the business process |
| Date Group | The day the process ran |
| Deployment ID | A unique identifier pointing to a version of the process |
| Elapsed Time | Duration of time it took to run the process |
| Error | A brief error message, if applicable |
| Error Count | The number of documents that had errors |
| Execution Mode | Whether a manual execution, or a scheduled one, etc |
| Connector Usage | Connector types deployed, names, and the number of connectors |
| Inbound Document Count and Size | The number of documents received inbound and their size |
| Outbound Document Count and Size | The number of documents outbound and their size |
| Throughput | Document inbound size + document outbound size/2 |
| Process ID and Name | Name and unique identifier of a business process |

-continued

| FIELD | DESCRIPTION |
| --- | --- |
| Original Execution ID | Applicable if this execution was a retry of a previous execution; unique identifier of the previous execution |
| Retry Flag and Count | Status as a retry and how many |
| Start Step Information | ID, action, name, type, etc. |
| Status | Success, error, or pending |
| Top Level Process ID | If this is a sub process, ID number of the top process |

The business process execution record must at least include the following monitored business process data: the process ID or name, the execution ID, the account ID, and at least one measured data metric.

Additional types of data, referred to as tracked data, may also be gathered relating to the operation of an integrated business process. For example, more in depth information may be important to the service provider, enterprise, or trading partner relating to the documents or data passing through the customized executable system integration software applications. This additional in-depth tracked data can permit, for example, an order to be tracked through the system as it is passed through the customized executable system integration software applications. By way of additional example, tracked data may be information recorded about individual documents. Tracked data may comprise a time record when a document was processed, how it was processed, a document name or descriptor, the category of document (order, invoice, type of business, or other), which connectors and other elements of the integrated business process the document passed through, and any correspondence related to the document. Examples of tracked data may also include connector read files indicating file names, order numbers, invoice numbers, account identification information, document fields such as account names, relationships between documents and sub-documents of one or more business processes. Tracked information may also include the relationships between inbound and outbound documents; including inbound documents that may split into more than one outbound document or plural inbound documents combined into fewer outbound documents.

To be able to track information or documents, document names or other the identifying information may be recorded at each element or step in the integrated business process. Maintaining these additional records can slow the performance of processing documents and completing the integrated business process. Nonetheless, this type of information and an extended historical archive of this type of information may be relevant in many circumstances. Having data to track a transaction through an integrated business process may be important to both business-to-business and business-to-consumer applications. The information may be used, for example, to identify the progress of a document through an automated system. As another example, if there was an error, this tracked data may allow identification at which step the error occurred.

The monitored business process data and tracked data may be reported back to a common location such as a service provider hosted application or website. In the specific embodiment discussed, the monitored and tracked data is stored locally in RAM and/or on disk until the business process execution is complete. Upon completion, the present embodiment reports the process execution record back to a service provider database. The monitored integrated business process data and tracked data may be associated with an account and account data stored at the service provider database or other database.

Data may be taken or reported from individual runtime engines managing specific integrations. Data may also be taken or reported from multiple customized executable system integration software applications for purposes of comparison or overall performance assessment. Thus, potential scope of reported data may be vast. The present disclosure provides the service provider, enterprise or trading partner with a system and method for assessing and predicting performance of an integrated business process or processes based on a combination of factors from monitored business process data, tracked data, or account data. The performance prediction system disclosed enables assessment of integrated business process performance or account usage of systems for deploying the customized executable system integration software application.

The business process data measurements may be reported from business process flows using the customized executable system integration software application, for example, reporting of data flows between trading partner and enterprise systems. Example data may include throughput, process error counts, execution counts, document counts, and connector usage or type. This data reflects business process information relating to trading partners, activities, enterprise applications, function of enterprise system attributes, and/or process attributes that are unique to the end-to-end business integration process of a specific enterprise. The data reflects the units of work and workflow conducted by the system as part of the integration process. For example, the integrated business process transforms data from one format to another, routes data down multiple paths of execution by examining the contents of the data, and business logic may validate the data being processed. The data is provided from one or more of the elements that constitute the exemplary business process flow diagram shown in FIG. 2. The data indicates amount of documents or data, the sources of documents or data, and types of documents or data process by the integrated business process. This information enables prediction of the ongoing performance of a deployed integrated business process or the chances an account may renew or cancel.

Part of the monitored business process data may be received from any of the customized codesets represented by Inbound connector elements 214, outbound connector elements 234, 238, 242, and 246, and the other elements in the example end-to-end integration model shown in FIG. 2. Still other monitored business process data and tracked data may be received more generally from the customized executable system integration software application though not from any specific element. In one embodiment, many fields of process identification data may be generally recorded from the customized execution integration application. The monitored business process data is stored in RAM during the execution of the integrated business process. The monitored business process data stored in RAM becomes the business process execution record. Some or all of this record may be stored during or after execution on a disk in the information handling system running the integrated business process. This business process execution record is reported back to the location collecting such data such as the service provider system/server 80 in the present embodiment. Tracked data may be stored in RAM, on disk, or in static memory during execution or after execution of the integrated business process. Tracked data is similarly reported back to a location collecting such data. In the presently described embodiment, this location is the service provider system/server 80.

By way of exemplary embodiment, monitored business process data measured and recorded from an Inbound connector element 214 is specifically described. An Inbound connector element 214 may continuously report its status, for example active or inactive, during operation of the business process integration. The customized code executing the functions of the Inbound connector element 214 may also count and report the number of inbound documents handled by this element. The inbound document count is reported for the given period of time that the Inbound connector element 214 is running that particular business process execution event. The Inbound connector element code may also collect and report data reflecting errors in processing that occur. Finally, the Inbound connector element code may contribute to data collected and reported relating to the amount of data that passes through it. This data reflects some part of the amount of data (in bytes) that passes through the entire customized executable system integration software application. Data may also be collected indicating what is connected to the Inbound connector. For example, data may indicate whether an Inbound connector is receiving data or documents from an external trading partner, from external web requests, or from a location internal to the enterprise user of the integrated business process. The above is just an example of data collected from an Inbound connector.

Similar or analogous data may be collected from other elements including Outbound connector elements. For example, an Outbound connector element may also report status, what it is connected to, outbound document counts, and outbound data volumes.

In addition to collecting data specific to business process elements, overall data relating to the operation of the customized executable system integration software application may be collected as monitored business process data. For example, each customized executable system integration software application may collect information indicating how many connectors are deployed, start and end time of the business process execution event, duration of the business process execution event, location identification of the business process execution, account identification for the user of the business process information, how many documents are processed or modified for integration purposes, how much data passes through the integration, and how many errors occur. Further example monitored business process data fields are shown above in Table 1. When data from all elements and the overall customized executable system integration software application has been assembled, a business process execution record is created for the execution of a given integrated business process event.

Tracked data, described above, may also be gathered relating to the execution of an integrated business process. The database at the service provider system/server or other information handling system may also receive tracked data relating to the documents processed through the customized executable system integration software application.

Figure 3:
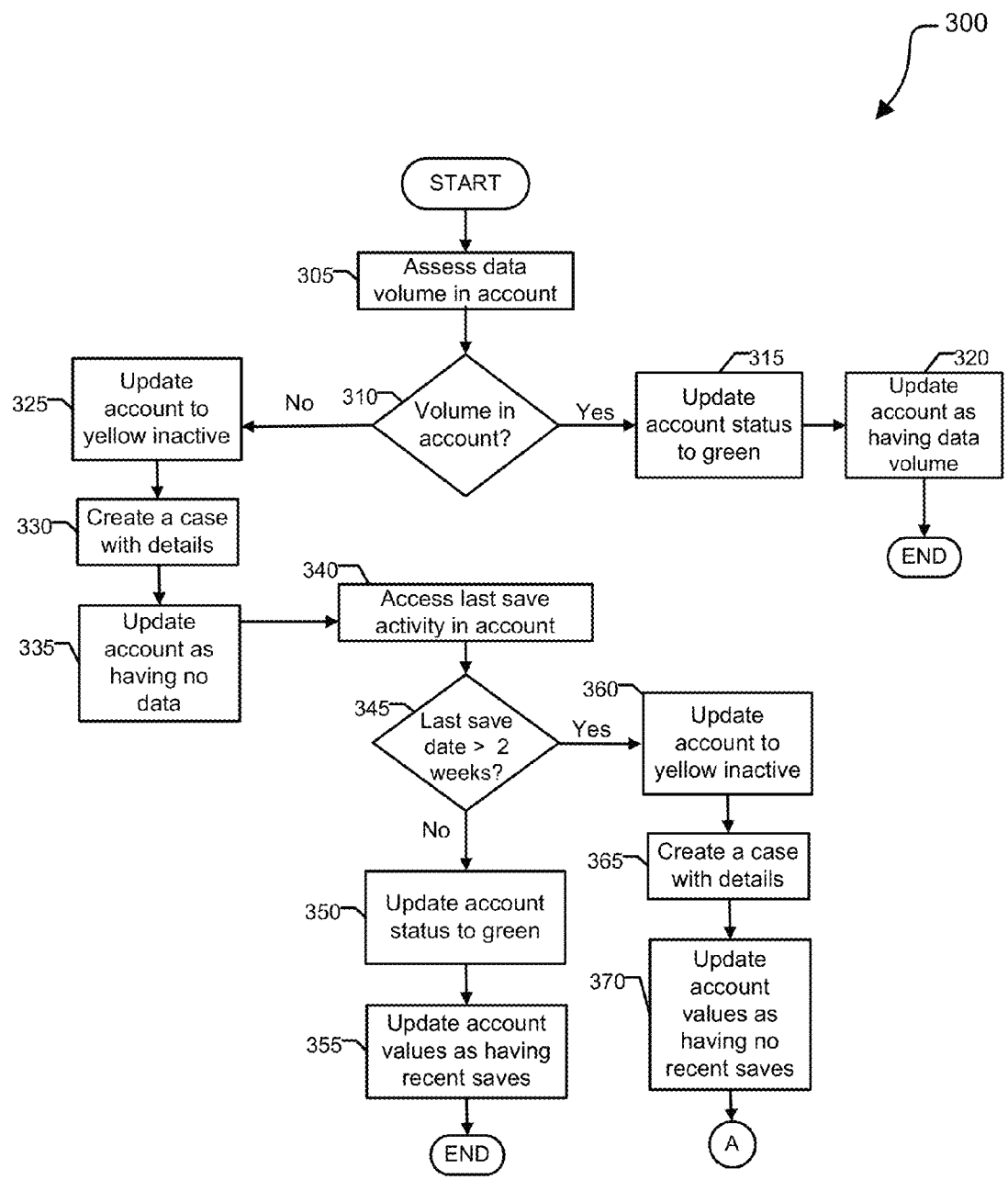
FIG. 3 is a flow diagram illustrating a method according to an embodiment of the present disclosure.

FIG. 3 shows a method 300 in accordance with an embodiment of the present disclosure for predicting performance of the integrated business process at a given location. The method 300 shows an embodiment for assessing the business process data collected from the elements of a customized executable system integration software application and account information related to the deployed integrated business process. This aggregate business process data and account data is analyzed to determine, among other things, how the well the integrated business process is performing. The determination of these factors is used to indicate a qualitative integrated business process performance designation.

Depending on the designation assigned, the system may automatically create a client case file and notification of a need to address problems or risks with an account or a specific integrated business process.

The flow begins at block 305 where the exemplary performance prediction system assesses aggregate business process data for an inbound or outbound volume of data or documents. The age of this activity may also be determined. The flow proceeds to block 310 where the processor operating the performance prediction system determines if there is recent data volume that has been handled by the integrated business process under a particular account. The time criterion may in one example embodiment determine whether data volume has been handled within the past two weeks. Of course, the service provider or user may set the time period to any value. The time criterion may range from an assessment of immediately recent data volume back to months or even years. The time period may be based on what the service provider or user concludes is a normal frequency of use for a deployed integrated business process. A less frequently used integrated business process will have a longer time period. A more regularly used integrated business process will have a shorter time period.

If there is data volume within the specified time period, the flow proceeds to block 315. The performance prediction system updates the account data for the integrated business process to green status. As described above, this is an indication that the integrated business process is operating in a satisfactory way. Then flow proceeds to block 320 where the performance prediction system updates the account data for the integrated business process to indicate the existence of recent data volume.

If there is no data volume within the specified time period, the flow of the presently described embodiment proceeds to block 325. At block 325, the performance prediction system updates the account data for the integrated business process to yellow status indicating an at-risk account or integrated business process. This is an indication of inactivity as described above. Then flow proceeds to block 330 where the performance prediction system creates a case file with details indicating which measurements of inactivity are affirmative. This case file may include a notification and report feature to provide inactivity and the at-risk status to either a service provider or a user enterprise. At block 335, the performance prediction system updates the account data to indicate no recent data volume.

Next, the method proceeds to block 340. At block 340, the performance prediction system running on the processor at the service provider system/server assesses account data pertaining to the integrated business process. The performance prediction system reads when the last saved change was made to the integrated business process. Such saved changes can indicate ongoing upgrades to the integrated business process or ongoing implementation efforts of a new integrated business process. In any event, such ongoing efforts would cause little or no data volume in an integrated business process under a given account. In the described embodiment, at block 345 the performance prediction system determines whether the last save activity in the account is greater than two weeks old. As described above, the time period used may vary. For example, it may depend on how long each step is estimated to take in the integrated business process design or deployment.

If account save activity for the integrated business process is less than the time period, for example two weeks, the method proceeds to block 350. At block 350, the performance prediction system updates the account data for the integrated business process to green status. As described above, this is an indication that the integrated business process is operating in a satisfactory way. Then flow proceeds to block 355 where the performance prediction system updates the account data for the integrated business process to indicate the existence of recent saves to the integrated business process model.

If account save activity for the integrated business process is greater than the time period, for example two weeks, then the method proceeds to block 360. At block 360, the performance prediction system updates the account data for the integrated business process to yellow status indicating an at-risk account or integrated business process. This is an indication of inactivity as described above. Then flow proceeds to block 365 where the performance prediction system creates a case file with details indicating which measurements of inactivity are affirmative. This case file may include a notification and report feature to provide inactivity and the at-risk status to either a service provider or a user enterprise. At block 370, the performance prediction system updates the account data to indicate no recent save activity.

Figure 4:
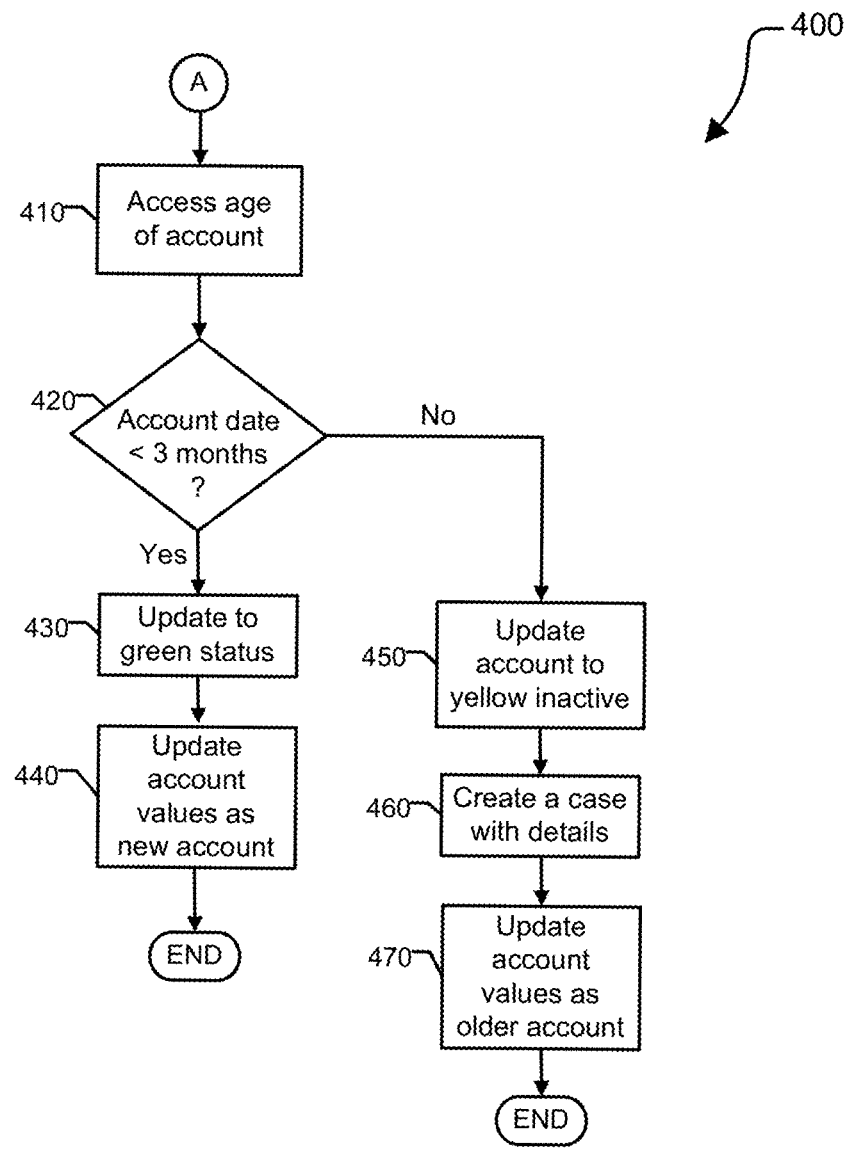
FIG. 4 is a flow diagram illustrating another method according to an embodiment of the present disclosure.

The method next proceeds to FIG. 4. FIG. 4 shows a method 400 for determining the age of either the account or the deployed integrated business process from the account data. The flow begins at block 410 where the exemplary performance prediction system assesses account data to determine when the account was opened and the license to the system for creating the integrated business process started.

Then the flow proceeds to block 420 where the processor operating the performance prediction system determines if account age is older or less than a set age limit. In a preferred embodiment, this age limit is set at three months. This is the time it takes to complete most integrated business process modeling, testing, and deployment. This age limit may be set at any level by the service provider or user. The age limit will depend on the time it takes to create an integrated business process model, test it, and deploy it. It may be selected to be the time that most integrated business process models take to implement. Alternatively, the service provider or user may select an age limit based on the time that nearly all integrated business process models should take to implement. Some integrated business processes will be more complicated, other less so. Accordingly, the time period may be longer for more complicated business process types.

If the account age is less than the age limit, for example three months in the shown embodiment, the method proceeds to block 430. At block 430, the performance prediction system updates the account data for the integrated business process to green status. As described above, this is an indication that the integrated business process is operating in a satisfactory way. Then flow proceeds to block 440 where the performance prediction system updates the account data for the integrated business process to indicate the newness of the account.

If the account age is greater than the age limit, for example three months, the method proceeds to block 450. At block 450, the performance prediction system updates the account data for the integrated business process to yellow status indicating an at-risk account or integrated business process. This is an indication of inactivity as described above. Then flow proceeds to block 460 where the performance prediction system creates a case file with details indicating which measurements of inactivity are affirmative. This case file may include a notification and report feature to provide inactivity and the at-risk status to either a service provider or a user enterprise. At block 470, the performance prediction system updates the account data for the integrated business process to indicate that the account is an older account and the age of the account.

In another embodiment (not shown), the performance prediction system assesses aggregate business process data for the time of the last integrated business process event run by the customized executable system integration software application and its assigned a unique identification number or code. In determining the age of this last integrated business process event activity, the performance prediction system may compare the age of the last recorded business process event with a threshold age limit. Exceeding the threshold age limit of the last integrated business process event indicates inactivity. The threshold time criterion may, in one embodiment, be similar two weeks. Of course, the service provider or user may set the threshold age limit to any value, from a day to months or even years. The integrated business process event threshold age limit may be based on what the service provider or user concludes is a normal frequency of use for a deployed integrated business process. A less frequently used integrated business process will have a longer time period. A more regularly used integrated business process will have a shorter time period.

If the age of the last integrated business process event activity is greater than the threshold age limit, then the performance prediction system updates the account data for the integrated business process to yellow status indicating an at-risk account or integrated business process. This is an indication of inactivity as described above. Then the performance prediction system creates a case file with details indicating which measurements of inactivity are affirmative. This case file may include a notification and report feature to provide inactivity and the at-risk status to either a service provider or a user enterprise.

If the age of the last integrated business process event activity is greater than the threshold age limit, then the performance prediction system updates the account data for the integrated business process to green or satisfactory status.

It should be understood that the determinations of activity or inactivity by the performance prediction system described in the embodiments shown in FIG. 3 and FIG. 4 may be conducted in any order. Additional determinations of activity or inactivity based on account data or monitored business process data may also be made along with those described in the embodiments of FIG. 3 and FIG. 4.

In one embodiment, the information handling system operating the process performance prediction system is the service provider system/server 80 of FIG. 1. An information handling system with the enterprise network 90 is also contemplated to run the performance prediction system. Alternatively, the performance prediction system may be run from a hosted or other third environment (not shown in FIG. 1).

The information handling system running the performance prediction system in the presently described embodiment is located in the service provider system 80. In one particular embodiment, the information handling system running the integrated business process initiates an HTTP or other network protocol based web request to transfer the monitored and tracked data to storage location in the service provider's network 80. Alternatively, a performance prediction system could be maintained within the enterprise network 90 or hosted externally. The monitored and tracked data is reported back to the performance prediction system information handling system via well-known networked communication channels using standard communication protocols. Secured communications are preferable, and therefore, encryption techniques may be employed to communicate the monitored business process data and tracked data.

Figure 5:
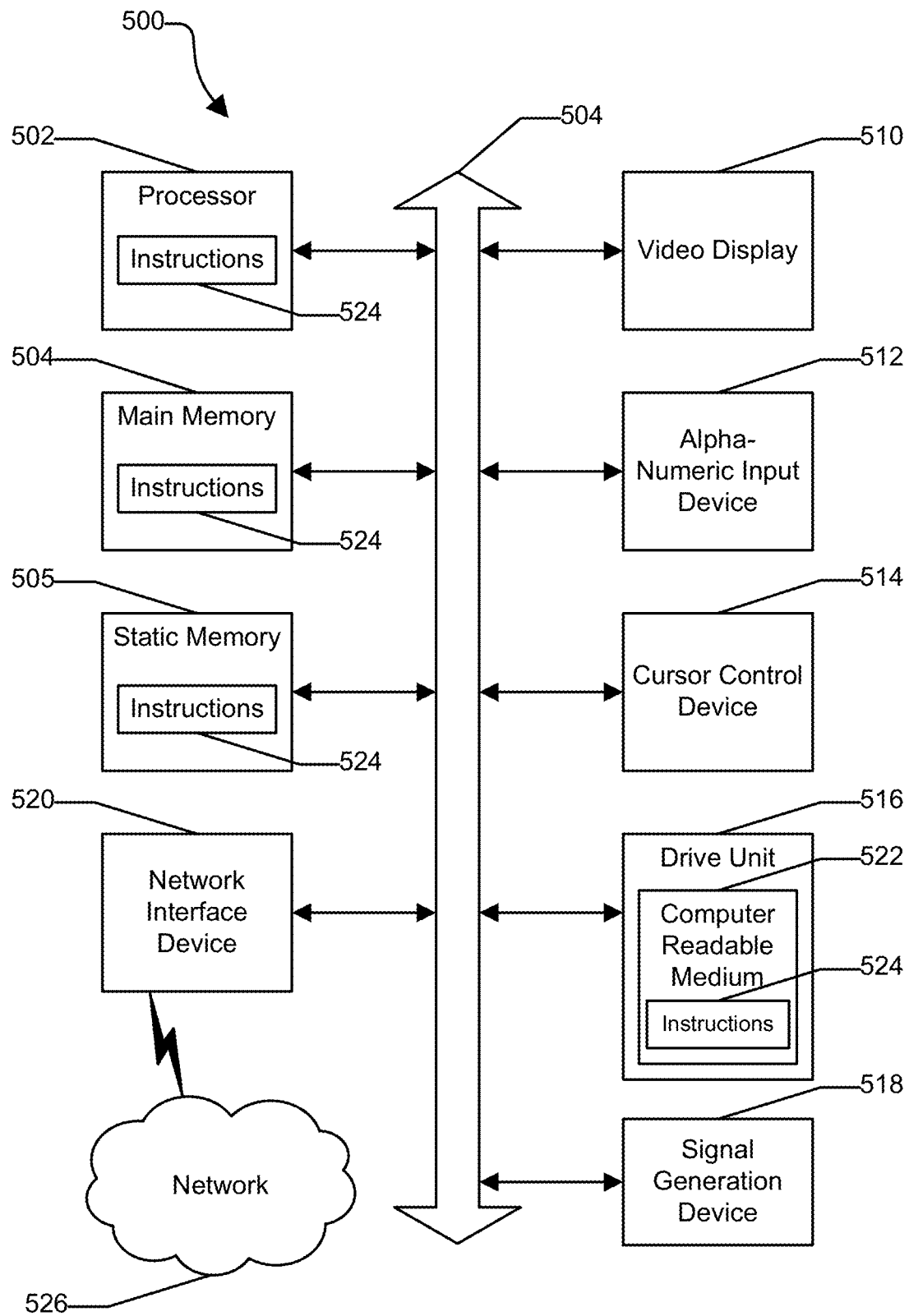
FIG. 5 is a flow diagram illustrating another method according to an embodiment of the present disclosure.

FIG. 5 shows an information handling system 500 capable of administering each of the specific embodiments of the present disclosure. The information handling system 500 can represent the user device 20, the systems 30, 60, 70, and 80 of FIG. 1, including the performance prediction system detecting and determining the type of integrated business process being executed, the system executing an integrated business process, or another data processing device associated with the business network system 10. The information handling system 500 may include a processor 502 such as a central processing unit (CPU), a graphics processing unit (GPU), or both. Moreover, the information handling system 500 can include a main memory 504 and a static memory 506 that can communicate with each other via a bus 508. As shown, the information handling system 500 may further include a video display unit 510, such as a liquid crystal display (LCD), an organic light emitting diode (OLED), a flat panel display, a solid state display, or a cathode ray tube (CRT). Additionally, the information handling system 500 may include an input device 512, such as a keyboard, and a cursor control device 514, such as a mouse. The information handling system 500 can also include a disk drive unit 516, a signal generation device 518, such as a speaker or remote control, and a network interface device 520. The information handling system 500 can represent a server device whose resources can be shared by multiple client devices, or it can represent an individual client device, such as a desktop personal computer.

The information handling system 500 can include a set of instructions that can be executed to cause the computer system to perform any one or more of the methods or computer based functions disclosed herein. The computer system 500 may operate as a standalone device or may be connected such as using a network, to other computer systems or peripheral devices.

In a networked deployment, the information handling system 500 may operate in the capacity of a server or as a client user computer in a server-client user network environment, or as a peer computer system in a peer-to-peer (or distributed) network environment. The information handling system 500 can also be implemented as or incorporated into various devices, such as a personal computer (PC), a tablet PC, a set-top box (STB), a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single information handling system 500 is illustrated, the term "system" shall also be taken to include any collection of systems or sub-systems that individually or jointly execute a set, or multiple sets, of instructions to perform one or more computer functions.

The disk drive unit 516 may include a computer-readable medium 522 in which one or more sets of instructions 524 such as software can be embedded. The disk drive unit 516 also contains space for data storage. Further, the instructions 524 may embody one or more of the methods or logic as described herein. In a particular embodiment, the instructions 524 may reside completely, or at least partially, within the main memory 504, the static memory 506, and/or within the processor 502 during execution by the information handling system 500. The main memory 504 and the processor 502 also may include computer-readable media. The network interface device 520 can provide connectivity to a network 526, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 524 or receives and executes instructions 524 responsive to a propagated signal; so that a device connected to a network 528 can communicate voice, video or data over the network 528. Further, the instructions 524 may be transmitted or received over the network 528 via the network interface device 520.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
a connection via a network interface for receiving business process data from an integrated business process enabling transformation of documents between a first data format and a second data format for electronic data exchange between data formats using automatically-generated, customized executable system integration software application code running at a location;
a storage device for storing data representing an aggregate of the business process data for the integrated business process, and for storing account data tracking an enterprise user's modification history of the integrated business process; and
a processor adapted to determine a qualitative integrated business process performance designation from the aggregate business process data and account data, the account data including at least an age of the account;
wherein the business process data, based on the transformation of documents between the first and second data formats, includes one or more of: an inbound document count, an outbound document count, an error count, or a throughput, and
the processor determines that when there is no data volume in response to the business process data having a value of zero and determines that there are no saved changes to the integrated business process within a specified time period from the enterprise user's most recent modification of the integrated business process based on the account data tracking the user's modification history, and based in part on the age of the account, then the processor allocates an at-risk integrated business process performance designation and prepares a case file for the integrated business process, the case file including a notification report and the at-risk business process performance designation;
the processor determines that when there is data volume in response to the business process data having a value that is not zero or determines a change to the integrated business process was saved within a specified time period from the enterprise user's most recent modification of the integrated business process and based in part upon the age of the account, the processor allocates a satisfactory integrated business process performance designation.

2. The system of claim 1, wherein when the processor determines there is data volume in response to the business process data having a value that is not zero, then the processor updates the case file for the integrated business process to indicate the integrated business process has data volume.

3. The system of claim 1, wherein the specified time period is five days or greater.

4. The system of claim 1, wherein when the processor determines that the age of the account is less than a threshold age, then the processor allocates a satisfactory integrated business process performance designation.

5. The system of claim 1, wherein the account data further comprises data indicating an age of the integrated business process since the enterprise user's creation of the integrated business process,
and wherein when the processor determines the age of the integrated business process is greater than a threshold age, then the processor allocates an at-risk integrated business process performance designation and prepares a case file for the integrated business process.

6. The system of claim 4, wherein the threshold age is two months or greater.

7. A computer-implemented method of predicting integrated business process system performance, comprising:
receiving, via a network interface device, business process data from an integrated business process enabling transformation of documents between a first data format and a second data format for electronic data exchange between data formats using automatically-generated, customized executable system integration software application code running at a location;
storing data at a storage device representing an aggregate of the business process data for the integrated business process, and for storing account data tracking an enterprise user's modification history of the integrated business process; and
determining, via a processor, a qualitative integrated business process performance designation from the aggregate business process data and account data, the account data including at least an age of the account;
wherein the business process data, based on the transformation of documents between the first and the second data formats, includes one or more of: an inbound document count, an outbound document count, an error count, or a throughput, and
determining via the processor that when there is no data volume in response to the business process data having a value of zero and that there are no saved changes to the integrated business process within a specified time period from the enterprise user's most recent modification of the integrated business process based on the account data tracking the user's modification history, and based in part on the age of the account, then allocating an at-risk integrated business process performance designation and preparing a case file for the integrated business process, the case file including a notification report and the at risk business process performance designation;
determining via the processor that when there is data volume in response to the business process data having a value that is not zero or that there was a change to the integrated business process saved within a specified time period from the enterprise user's most recent modification of the integrated business process, the processor allocates a satisfactory integrated business process performance designation to the account data.

8. The method of claim 7, further comprising updating the case file for the integrated business process to indicate the integrated business process has data volume in response to the processor determining that the business process data has a value that is not zero.

9. The method of claim 7, wherein the specified time period is five days or greater.

10. The method of claim 7, further comprising allocating a satisfactory integrated business process performance designation in response to the processor determining that the age of the account is less than a threshold age.

11. The method of claim 7, further comprising allocating an at-risk integrated business process performance designation and preparing a case file for the integrated business process via the processor8, in response to the processor determining that the age of the integrated business process is greater than a threshold age, wherein the account data further comprises data indicating an age of the integrated business process since the enterprise user created the integrated business process.

12. The method of claim 11, wherein the threshold age is two months or greater.

13. A non-transitory computer readable medium comprising instructions to manipulate a processor to:

receive, via a network interface device, business process data from an integrated business process enabling transformation of documents between a first data format and a second data format for electronic data exchange between data formats using automatically-generated, customized executable system integration software application code running at a location;

store data at a storage device representing an aggregate of the business process data for the integrated business process;

store account data tracking an enterprise user's modification history of the integrated business process for an account from a plurality of accounts; and determine, via the processor, a qualitative integrated business process performance designation from the aggregate business process data and account data, the account data including at least an age of the account;

wherein the business process data, based on the transformation of documents between the first and the second data formats, includes one or more of: an inbound document count, an outbound document count, an error count, or a throughput, and determines, via the processor, that there is no data volume in response to the business process data having a value of zero and that there are no saved changes to the integrated business process within a specified time period from the enterprise user's most recent modification of the integrated business process based on the account data tracking the user's modification history, and based in part on the age of the account, then the instructions manipulate the processor to allocate an at-risk integrated business process performance designation and prepare a case file for the integrated business process, the case file including a notification report and the at risk business process performance designation;

when the processor determines that there is data volume in response to the business process data having a value that is not zero or determines a change to the integrated business process was saved within a specified time period from the enterprise user's most recent modification of the integrated business process, the instructions manipulate the processor to allocate a satisfactory integrated business process performance designation.

14. The non-transitory computer readable medium of claim 13, further comprising instructions to manipulate a processor to update the case file for the integrated business process to indicate the integrated business process has data volume in response to the processor determining that the business process data has a value that is not zero.

15. The non-transitory computer readable medium of claim 13, wherein the specified time period is five days or greater.

16. The non-transitory computer readable medium of claim 13, further comprising instructions to manipulate a processor to allocate a satisfactory integrated business process performance designation in response to the processor determining that the age of the account is less than a threshold age.

17. The non-transitory computer readable medium of claim 13, further comprising allocating an at-risk integrated business process performance designation and preparing a case file for the integrated business process via the processor, in response to the processor determining that the age of the integrated business process is greater than a threshold age, wherein the account data further comprises data indicating an age of the integrated business process since the enterprise user established an account to create the integrated business process.

18. The non-transitory computer readable medium of claim 16, wherein the threshold age is two months or greater.

\* \* \* \* \*